United States Patent
Gabardo et al.

(10) Patent No.: US 11,626,105 B1
(45) Date of Patent: Apr. 11, 2023

(54) NATURAL LANGUAGE PROCESSING

(71) Applicant: Amazon Technologies, Inc., Seattle, WA (US)

(72) Inventors: Philip Gabardo, Santa Barbara, CA (US); Yang Alex Yau, Santa Barbara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 281 days.

(21) Appl. No.: 16/709,562

(22) Filed: Dec. 10, 2019

(51) Int. Cl.
| G10L 15/18 | (2013.01) |
| G10L 15/06 | (2013.01) |
| G10L 15/22 | (2006.01) |
| G10L 15/26 | (2006.01) |

(52) U.S. Cl.
CPC ........ *G10L 15/1815* (2013.01); *G10L 15/063* (2013.01); *G10L 15/22* (2013.01); *G10L 15/26* (2013.01)

(58) Field of Classification Search
CPC ... G10L 15/1815; G10L 15/063; G10L 15/22; G10L 15/26; G10L 15/05; G10L 15/30; G06F 3/167
See application file for complete search history.

(56) References Cited

U.S. PATENT DOCUMENTS

| 6,678,354 B1* | 1/2004 | Blue ................. H04M 1/24 |
| | | 379/1.02 |
| 6,728,671 B1* | 4/2004 | Johnson .............. G10L 15/26 |
| | | 379/88.04 |
| 10,482,182 B1* | 11/2019 | Jankowski, Jr. ..... G10L 15/1815 |
| 11,087,739 B1* | 8/2021 | Rastrow .............. G06F 40/216 |
| 2011/0060587 A1* | 3/2011 | Phillips ............... G10L 15/30 |
| | | 704/235 |
| 2013/0132086 A1* | 5/2013 | Xu ..................... G10L 15/005 |
| | | 704/251 |
| 2015/0025890 A1* | 1/2015 | Jagatheesan .......... G10L 15/32 |
| | | 704/255 |
| 2018/0047387 A1* | 2/2018 | Nir ..................... G10L 15/05 |
| 2019/0312973 A1* | 10/2019 | Engelke ............ H04M 1/2475 |
| 2020/0090640 A1* | 3/2020 | Kim .................... G10L 15/26 |
| 2020/0184967 A1* | 6/2020 | Gupta .................. G06F 3/167 |

* cited by examiner

*Primary Examiner* — Michael Colucci
(74) *Attorney, Agent, or Firm* — K&L Gates LLP

(57) ABSTRACT

Devices and techniques are generally described for delayed execution of natural language understanding processes. In various examples, input data is received. In some examples, automatic speech recognition (ASR) data is generated that represents the input data. In some further examples, processing of the ASR data by a first natural language understanding (NLU) process is initiated. In some examples, a first amount of time by which to delay processing of the ASR data by a second NLU process is determined. In at least some examples, processing of the ASR data by the second NLU process is initiated after the first amount of time has elapsed. The first NLU process may be unable to interpret the ASR data. The second NLU process may generate result data that may be stored in memory.

20 Claims, 7 Drawing Sheets

NATURAL LANGUAGE PROCESSING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
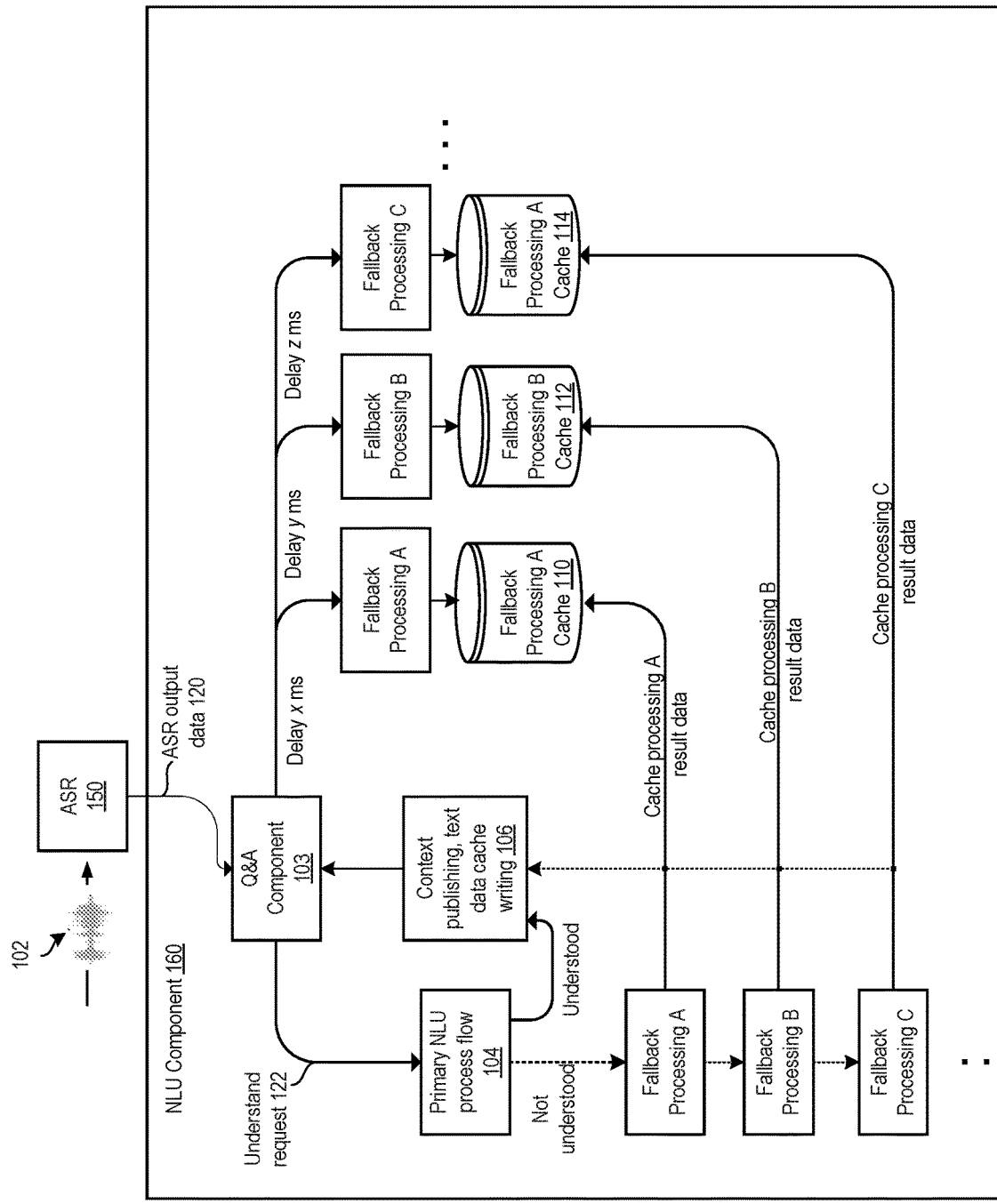
FIG. 1 is a block diagram illustrating an example of delayed execution of natural language process flows and caching processing output, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable commands or other type of instructions. As described in further detail below, in some examples, NLU processing may include multiple different process flows that may be executed for a given natural language input in order to determine a semantic interpretation of the natural language input. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a speech processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, speechlets, and/or other types of speech processing software.

In various examples, speech processing systems may determine an action to take for processing particular request data according to an interpretation of the natural language input (represented by the request data), as determined by NLU. In various examples, multiple NLU process flows may be executed for a given natural language input as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. An example of a possible primary NLU process flow is described below in reference to FIG. 7. In another example, a contextual carry-over NLU process flow may identify entities (e.g., nouns and/or pronouns) in a given natural language input based on contextual data stored in relation to one or more previous natural language inputs. In various examples, the semantic meaning of a given utterance determined using the primary NLU process flow may differ from the semantic meaning of the same utterance determined using the contextual carry-over NLU process flow. In another example, a candidate-based parsing NLU process flow may be used to derive the semantic meaning of particular types of natural language inputs. Candidate-based parsing NLU processing may involve determining named entities (e.g., the names of people, places, and/or entities) included in a natural input and comparing the recognized named entities to a table that includes previously-stored question-and-answer pairs to determine a likely question that is being asked by the user. In various examples, it may be advantageous to perform NLU processing using multiple process flows (e.g., including one or more of those NLU process flows described above) in case the primary NLU process flow is unable to determine a semantic interpretation of the natural language input. In some other examples, it may be advantageous to perform NLU processing using multiple process flows as one or more of the secondary process flows may determine a semantic interpretation that is more appropriate for a given utterance relative to the primary NLU process flow. As used herein, a "process flow" may refer to one or more computer-executable operations performed in accordance with a given NLU strategy used to derive meaning for particular request data (e.g., for a particular user utterance). In some examples, process flows may be referred to as "pipelines," as a particular process flow may involve multiple steps performed in accordance with computer-readable instructions defining the process flow. In various examples, processing of data by the various NLU process flows described herein may be scheduled using an NLU execution strategy, as described in further detail below.

Multiple NLU process flows may be executed serially or in parallel for a given natural language input. Parallel processing by each of multiple NLU processes may result in an overall decrease in speech processing latency (e.g., the time between when a user makes a request and when the speech processing system returns a result), as each NLU process flow may perform actions in parallel and the derived meaning of the natural language input may thereby be determined (e.g., selected from among the one or more NLU process flow outputs) more quickly relative to serial processing of each NLU process flow. However, some NLU process flows may perform redundant operations with respect to other NLU process flows. Additionally, some NLU process flows may be unable and/or unlikely to be capable of deriving a semantic interpretation of particular request data. Furthermore, some process flows may generate redundant NLU output data (e.g., intent data representing a semantic interpretation of the natural language input) as other NLU process flows. Accordingly, executing each NLU processing strategy (e.g., each NLU process flow may represent a different NLU processing strategy) in parallel may result in an increased cost (e.g., in terms of CPU cycles and/or memory usage) for processing a given natural language input, relative to processing the input serially.

Processing a given natural language input serially (e.g., first processing with a primary NLU process flow, followed by a first fallback NLU process flow, followed by a second fallback NLU process flow, etc.) may result in a reduced processing cost (as only a single NLU process flow may be executing at a given time). However, serial execution of each NLU process flow may result in increased latency as each NLU process flow may be executed following the completion of processing by the preceding NLU process flow.

Accordingly, described herein, are dynamic techniques that may be used to optimize NLU processing of request data for latency and/or computing cost. In various examples, NLU process flows may be executed at least partially in parallel, with execution of particular NLU process flows being delayed relative to other NLU process flows. For example, an NLU process flow that is determined to be unlikely to result in the correct semantic interpretation of request data may be delayed relative to another NLU process flow that is determined to be likely to result in the correct semantic interpretation of the request data. In another example, execution of one or more NLU process flows may be delayed until entity recognition (ER) processing has completed (e.g., where ER processing is performed as part of a primary NLU process flow or other fallback NLU process flow). The ER processing results may be used during processing of the request data by the delayed process flows. Accordingly, ER processing result data may be cached prior to execution of the delayed process flows so that the ER processing result data is available for the delayed process flows. Advantageously, in this example, each of the delayed NLU processing flows is not required to perform redundant ER processing and/or is not required to wait until ER processing is completed (potentially resulting in a timeout for a given NLU process flow).

In some examples, whether or not to execute one or more process flows, the order in which to execute the process flows, how much to delay execution of a given process flow relative to some other process flow, what pre-processing for the input data (e.g., the ASR output data and/or contextual data related to the request data) should be performed, etc., may be dynamically determined using a machine learning model. The machine learning model may be optimized based on specified constraints (e.g., latency, computing cost, accuracy of NLU results, etc.) and/or combinations of specified constraints. In various examples, the machine learning model may receive ASR output data and/or context data describing a context of a natural language input received from a user and may be trained to output NLU execution strategy data (e.g., data specifying which NLU process flows should be executed, in which order, execution delays for each applicable pipeline, etc.).

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

The various techniques described herein and speech processing generally may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., the Alexa system from Amazon.com, Inc. of Seattle, Wash., etc.

Speech processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user request data by outputting content and/or performing one or more other actions, such as initiating communications (e.g., synchronous phone/video calls and/or asynchronous messaging), answering questions, playing music, providing information, calling a taxi, displaying an image, controlling other devices, etc. Generally, input data received by the various speech processing systems and components described herein may comprise natural language input data. Natural language input data may be in the form of audio data representing spoken user request data (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "speech processing applications". Natural language processing systems may be effective to process spoken and/or textual natural language inputs to determine data representing a semantic understanding of the inputs. Speech processing applications may include any application effective to receive inputs from a natural language processing system in order to take one or more actions based on those inputs. For example, a speech processing system may include music speech processing applications, video speech processing applications, calendar speech processing applications, timer speech processing applications, general knowledge answering speech processing applications, game speech processing applications, device control skills, etc. As described herein, speech processing applications receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a speech processing application by a user's request may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

FIG. 1 is a block diagram illustrating an example of delayed execution of natural language process flows and caching processing output, according to various embodiments of the present disclosure.

In the example depicted in FIG. 1, audio data 102 representing a user utterance may be received by a speech processing system. Although audio data 102 is depicted and described with respect to FIG. 1, it should be appreciated that any natural language input may be used in accordance with the various techniques described herein. For example, input text data may instead be used in accordance with the various techniques described herein. The speech processing system may include ASR component 150. ASR component 150 may be effective to process the audio data 102 to generate ASR output data 120 (e.g., text data representing the audio data 102 and/or other data associated with the audio data 102 and/or with a user request generally). In at least some examples, ASR output data 120 may be referred to as "ASR data."

A determination may be made that the ASR output data 120 corresponds to a question. For example, NLU processing and/or pre-processing may be performed by NLU component 160. NLU component 160 may determine that the ASR output data 120 includes text that indicates that the audio data 102 represents a user question. For example, the text data may include interrogative terms such as "who," "how," "what," "where," "why," and/or "when." Accordingly, the ASR output data 120 may be sent to question and answer component 103. In various examples, question and answer component 103 may control execution of one or more NLU processing flows used to derive semantic interpretations (e.g., intent data) of ASR output data 120 determined to be a question.

In at least some examples, the question and answer component 103 may use a heuristic approach to delay execution of the various NLU processing flows in order to achieve benefits in terms of NLU-processing latency and/or in terms of computing costs. In various other examples, question and answer component 103 may use a machine learning model to determine an appropriate NLU execution strategy for particular request data (as described in further detail below).

In various examples, question and answer component 103 may send an understand request 122 to a primary NLU process flow 104. The understand request 122 may include the ASR output data 120 and/or context data related to audio data 102 (e.g., a user ID, a device ID, a location at which the request was received, data representing a previous question asked at the same device, etc.). Primary NLU process flow 104 may process the ASR output data 120 according to the particularities of the primary NLU process flow 104. For example, various techniques such as those described below in reference to FIG. 7 may be performed by primary NLU process flow 104 in order to determine a semantic interpretation (e.g., intent data) representing the ASR output data 120 (and ultimately representing the user's request). In the example depicted in FIG. 1, if the ASR output data 120 is understood by the primary NLU process flow 104 (e.g., if the primary NLU process flow determines recognized entities and/or a matching question template corresponding to the ASR output data 120, etc.), the data representing the understood question (e.g., intent data) may be returned to question and answer component 103 for further processing and/or to a skill configured to answer the question. Additionally, context data related to the question along with text data representing the question (and/or the question/answer pair) may be stored at action 106 (e.g., in a cache). In at least some examples, context data stored at action 106 may be conditioned on the various fallback processing process flows (e.g., Fallback processing A, B, and/or C) successfully processing the request data representing the utterance. If the various fallback processing process flows are unable to understand the utterance, data may be stored in caches 110, 112, and/or 114 indicating that the fallback processing process flow was unable to understand the request data. In various examples, such data may be accessed by process flows of NLU component 160 and used to answer one or more subsequent questions.

In at least some examples, when one of the NLU process flows (e.g., primary NLU process flow 104, fallback processing A, fallback processing B, fallback processing C) returns a semantic interpretation of the request data (e.g., ASR output data such as text data representing an utterance) processing by the other NLU process flows may be terminated and/or cancelled. In various examples, an NLU process flow may be unable to understand a particular utterance. For example, an NLU process flow may be unable to match text data representing the utterance to any templates stored in a memory. When NLU process flows are unable to determine a semantic understanding of the current request data, the NLU process flow may generate data indicating that the particular NLU process flow did not understand the request. In other words, the NLU process flow may generate data indicating that the particular NLU process was unable to determine a semantic interpretation of the ASR output data. In such a case, question and answer component 103 may check downstream caches to determine if a downstream NLU process flow has returned a semantic interpretation for the current utterance. For example, if primary NLU process flow 104 generates data indicating that primary NLU process flow 104 was unable to determine a semantic interpretation of the current ASR data, question and answer component 103 may search fallback process A cache 110 for the semantic interpretation. If data stored in fallback process A cache 110 indicates that fallback processing A was unable to determine a semantic interpretation of the current ASR data, question and answer component 103 may search fallback process B cache 110, and so on. When semantic interpretation data is located, processing by any NLU process flows that have not yet completed may be terminated.

In the example depicted in FIG. 1, if primary NLU process flow 104 is unable to generate semantic interpretation data representing the ASR output data 120 (e.g., the primary NLU process flow 104 is unable to understand the ASR output data 120) and/or the primary NLU process flow 104 times out, the ASR output data 120 and/or associated context data may be sent to one or more fallback processing flows. Depending on the desired implementation, the fallback process flows (e.g., fallback processing A, fallback processing B, fallback processing C, etc.) may be executed serially and/or at least partially in parallel. In some examples, if the fallback processing is executed serially, the order of fallback processing flows may be determined based on characteristics of the ASR output data 120 and/or context data associated with the ASR output data 120. In at least some examples, during serial execution, fallback NLU processing may be terminated after an acceptable semantic interpretation is determined (e.g., a semantic interpretation associated with a confidence score that is above a confidence score threshold). For example, if fallback processing A is performed first (after primary NLU process flow 104) and generates a high confidence score indicating that a semantic interpretation of the ASR output data 120 generated by fallback processing A is likely to be correct, the result data may be returned to question and answer component 103 and further processing by fallback processing B and fallback processing C may not be performed. Accordingly, lines connecting fallback processing A, B, and C in FIG. 1 are depicted as dashed lines to indicate that processing may be terminated early if a process flow is able to successfully process the current request data. Further, the result data generated by each of the process flows (e.g., primary NLU process flow 104, fallback processing A, B, and/or C) may be cached in respective caches (e.g., cache 110, cache 112, cache 114, etc.). Question and answer component 103 may search the caches 110, 112, 114, during processing. In some examples, if an acceptable result is found (e.g., semantic interpretation data associated with a confidence score that is above a confidence score threshold, etc.), processing by various unexecuted and/or incomplete fallback processing flows and/or by the primary NLU process flow 104 may be cancelled and/or terminated, in order to reduce latency.

In some further examples, processing by fallback processing flows (e.g., fallback processing A, B, and C) may be performed at least partially in parallel with respect to one another and/or with respect to primary NLU process flow 104. In various examples, question and answer component 103 may delay execution of one or more of the various process flows (e.g., primary NLU process flow 104, fallback processing A, B, and/or C) in order to eliminate redundant processing operations and/or in order to execute latency-intensive and/or computing cost-intensive process flows only when necessary in order to generate the correct result.

For example, the ASR output data 120 and/or associated context data may be sent to one or more of fallback processing A, fallback processing B, and/or fallback processing C (as well as to one or more other fallback processing flows not shown in FIG. 1). The number of fallback processing flows depends on the particular implementation. In various examples, the order of processing by fallback processing A, fallback processing B, and/or fallback processing C may be selected according to characteristics of the ASR output data 120. For example, fallback processing A may be determined to have the highest likelihood among the fallback processing flows to generate semantic interpretation data for the ASR output data 120 based on characteristics of the ASR output data 120. Accordingly, fallback processing A may be executed without any delay and/or with a smallest time delay (e.g., relative to processing by primary NLU process flow 104). For example, the ASR output data 120 may include the text "How do I wash a dog?" The text includes the interrogative term "how" and also may include a question structure (e.g., "How do I . . . ") that is typically best interpreted by fallback processing A—which may represent a candidate-only parsing strategy. Candidate parsing typically performs entity recognition (and/or uses pre-cached entity recognition data) for the ASR output data 120 and uses recognized entities (e.g., "dog") to match the text data with previous questions that have been stored in a memory. In the current example, execution of fallback processing B and/or fallback processing C may be delayed to allow primary NLU process flow 104 and/or fallback processing A to at least partially complete prior to execution of fallback processing B and/or fallback processing C.

In at least some examples, fallback processing A (and/or fallback processing B, fallback processing C, etc.) may be performed in parallel with respect to primary NLU process flow 104 (depending on the particular implementation). In such examples, the execution of fallback processing A (and/or fallback processing B, fallback processing C, etc.) may be delayed in order to avoid redundant processing. For example, if fallback processing A is candidate-only parsing that first performs entity recognition processing, as described above. Execution of fallback processing A may be delayed until primary NLU process flow 104 has completed entity recognition processing and has cached the result (or vice versa). Accordingly, fallback processing A may retrieve the entity recognition processing result data from a cache instead of performing a redundant entity recognition operation for the same request data (e.g., for the same ASR output data 120). Execution of fallback processing B and/or fallback processing C, etc., may be delayed until primary NLU process flow 104 and/or fallback processing A have completed. If primary NLU process flow 104 and/or fallback processing A have generated and cached result data that is determined to be an accurate semantic interpretation of the ASR output data 120, a command may be sent to terminate and/or cancel processing by fallback processing B, fallback processing C, and/or other delayed process flows in order to eliminate redundant processing.

Further, as previously described, the order of one or more process flows (including primary NLU process flow 104, and/or the various fallback process flows) may be selected based on the ASR output data 120 so that the NLU process flows that are most likely to generate the correct result are performed first (and/or are executed after the shortest delay). For example, each process flow may generate an estimate of whether the process flow is confident in its ability to generate a semantic interpretation of the ASR output data 120 (e.g., using a machine learning model at a pre-processing stage). Thereafter, the various NLU process flows may be executed in descending order of confidence scores indicating the likelihood that the process flow is able to generate semantic interpretation data for the ASR output data 120. In various examples, once an NLU process flow generates a result representing a semantic interpretation of the request data, processing by downstream process flows may be cancelled and/or terminated.

After each NLU process flow returns result data (e.g., intent data representing a semantic interpretation of the ASR output data 120), the result data may be cached. For example, fallback processing A may generate result data that may be cached in fallback processing A cache 110. Similarly, fallback processing B may generate result data that may be cached in fallback processing B, etc. In some examples, question and answer component 103 may search the caches to determine if the fallback processing strategies have generated result data. In various examples, the question and answer component 103 may consult one or more of the caches (e.g., cache 110, cache 112, cache 114, etc.) to see if result data is available prior to initiating a new fallback processing flow. For example, fallback processing C may comprise a call to an external machine learning model that may introduce significant latency and/or significant computing cost into the system. Accordingly, prior to execution of fallback processing C, question and answer component 103 may search caches 110 and/or 112 for result data returned by fallback processing A and B, respectively. If a result is found in either cache 110 and/or cache 112, a command may be sent to fallback processing C effective to cancel and/or terminate processing of ASR output data 120 by fallback processing C.

Figure 2:
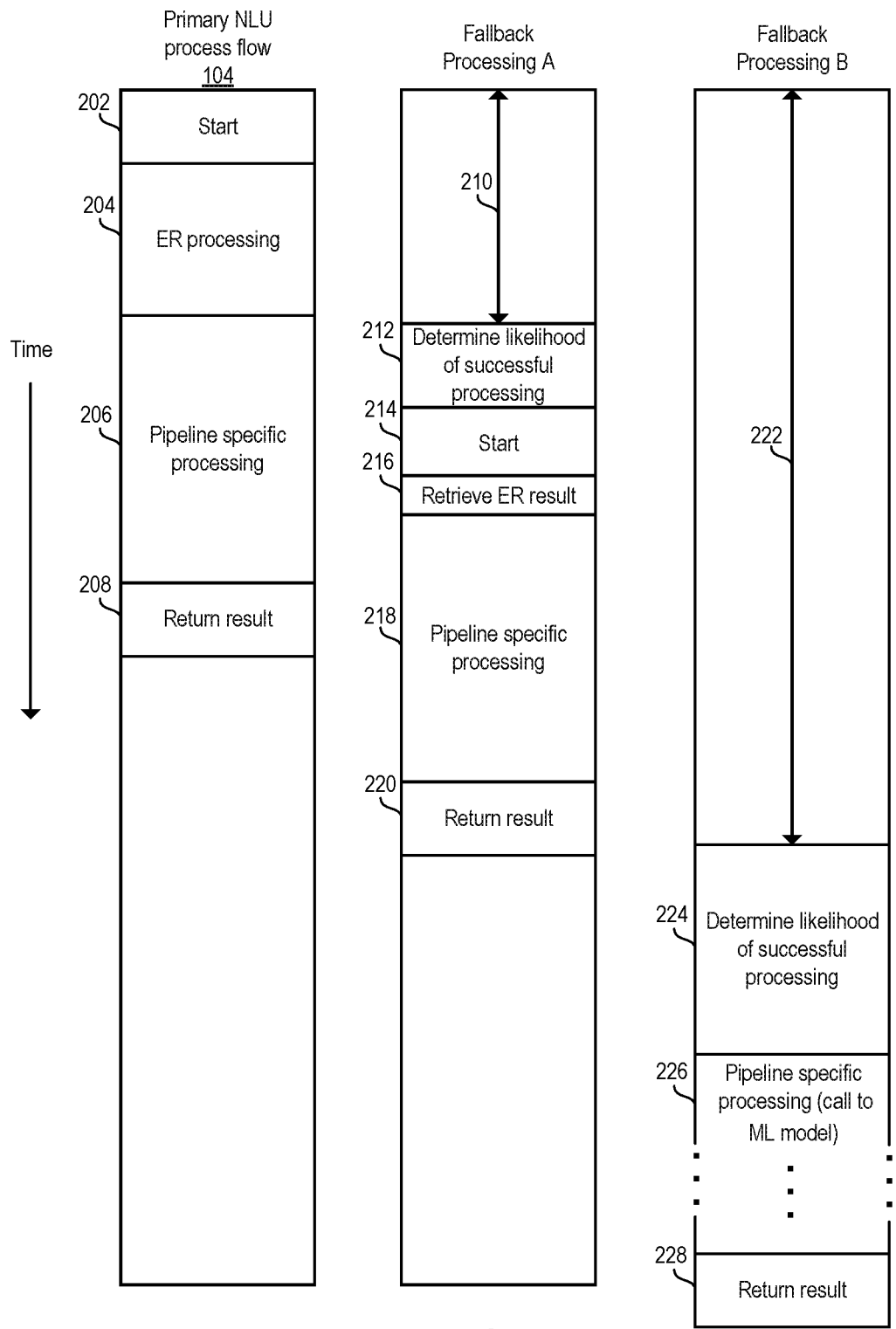
FIG. 2 is a timing diagram illustrating an example of delayed execution of natural language process flows, according to various embodiments of the present disclosure.

FIG. 2 is a timing diagram illustrating an example of delayed execution of natural language process flows, according to various embodiments of the present disclosure.

In the example depicted in FIG. 2, operations that occur above other operations occur at a prior time.

In the example depicted in FIG. 2, primary NLU process flow 104 may start at action 202. Action 202 may represent question and answer component 103 sending understand request 122 (e.g., a computer-executable command) to primary NLU process flow 104 instructing primary NLU process flow 104 to generate an NLU interpretation of the natural language input represented by ASR output data 120.

Contemporaneously, execution by fallback processing A and fallback processing B may be delayed by a first amount of time 210 and a second amount of time 222, respectively. In at least some examples, execution by fallback processing A and/or B may be delayed so that one or more intermediate results of primary NLU process flow 104 (and/or another process flow) may be cached. Accordingly, the intermediate results may be available for fallback processing A and/or B upon initiation of processing by these workflows without requiring the duplicative processing to generate the intermediate results.

For example, following action 202, primary NLU process flow 104 may perform entity recognition (ER) processing at action 204. ER processing may be used to recognize one or more named entities present in text data (and/or in ASR output data, more generally). In some examples, fallback processing A and/or B may utilize ER processing result data. Accordingly, by delaying execution of fallback processing A and/or B until after primary NLU process flow 104 has completed ER processing, fallback processing A and/or B may use the ER result data (sometimes referred to as "ER data") generated by the primary NLU process flow 104 without having to re-perform ER processing. In various examples, following the completion of ER processing at action 204, primary NLU process flow 104 may cache the results of the ER processing so that other NLU process flows that use the ER result data may have access to it.

Following ER processing, primary NLU process flow 104 may perform pipeline specific processing at action 206. In an example, pipeline specific processing may include matching the text data against previously-stored knowledge graphs and/or templates of text data. For example, in the question and answer context, the templates may be templates for forms of questions, such as "Who is _____?" "What is _____?" etc., with the blanks being slots that may be filled in by entity data determined during ER processing. Pipeline specific processing may include multiple different operations and/or processing steps, potentially including calls to one or more external services. Following the pipeline specific processing, the primary NLU process flow 104 may return result data at action 208. The result data may, in some cases, represent a semantic interpretation of the ASR output data which, in turn, represents a natural language input received from the user. The result data may be stored in a cache (e.g., in non-transitory computer-readable memory). In various examples, the result data may indicate that the primary NLU process flow was unable to interpret/understand the ASR output data. In some examples, the primary NLU process flow 104 returning result data that indicates that the primary NLU process flow 104 was unable to interpret the ASR output data may trigger execution of NLU processing by one or more of the fallback processing strategies. In some other examples, the primary NLU process flow 104 returning result data that indicates that the primary NLU process flow 104 was unable to interpret the ASR output data may cause caches associated with one or more fallback processing strategies to be searched to determine if the fallback NLU strategies were able to interpret the ASR output data.

Fallback processing A may begin executing following the delay represented by time 210. In some examples, fallback processing A may initially determine a likelihood that fallback processing A will be able to interpret the current ASR output data at action 212. In various examples, a rule-based approach and/or a machine learning based approach may be used to determine whether or not the fallback processing strategy represented by fallback processing A will be able to interpret the current ASR output data. In some examples, if a determination is made that fallback processing A is unlikely to be able to interpret the current ASR output data, processing by fallback processing A may be terminated at action 212. For example, if a confidence score of successful processing by fallback processing A is below a threshold confidence score, processing may be terminated.

At action 214, fallback processing A may initiate NLU process of the ASR output data. Notably, execution is initiated after ER processing is completed by the primary NLU process flow 104. Accordingly, at action 216, fallback processing A may retrieve the ER result data from the relevant cache. Additionally, in at least some examples, fallback processing A may retrieve and/or be sent context data associated with the current natural language input. Fallback processing A may perform pipeline specific processing (e.g., using the context data and/or the ER result data) at action 218. Pipeline specific processing at action 218 may represent a different NLU strategy relative to pipeline specific processing at action 206. For example, pipeline specific processing at action 218 may represent a contextual carry-over NLU strategy whereupon previously cached user question/answer pairs and/or context data may be used to determine a semantic interpretation of the current ASR output data. At action 220, fallback processing A may return result data at action 220. The result data may, in some cases, represent a semantic interpretation of the ASR output data which, in turn, represents a natural language input received from the user. The result data may be stored in a cache (e.g., in non-transitory computer-readable memory) associated with fallback processing A (e.g., cache 110 in FIG. 1). In various examples, the result data may indicate that the fallback processing A was unable to interpret/understand the ASR output data. In some examples, fallback processing A returning result data that indicates that fallback processing A was unable to interpret the ASR output data may trigger execution of NLU processing by one or more of the remaining fallback processing strategies. In some other examples, fallback processing A returning result data that indicates that fallback processing A was unable to interpret the ASR output data may cause caches associated with one or more fallback processing strategies to be searched to determine if the fallback NLU strategies were able to interpret the ASR output data (e.g., caches 112, 114 of FIG. 1).

Fallback processing B may begin executing following the delay represented by time 222. In the example depicted in FIG. 2, the time delay 222 may be long enough so that primary NLU process flow 104 and/or fallback processing A may have completed processing by the time fallback processing B begins execution (e.g., based on average processing times of each relevant process flow). In the example, fallback processing B may represent a statistical-based process flow that uses machine learning to determine a semantic interpretation of the ASR output data. In the example, fallback processing B may be significantly more expensive (in terms of latency and/or compute cost) relative to primary NLU process flow 104 and/or fallback processing A. Accordingly, the time delay 222 may be long enough to allow for the possibility that less computationally-intensive and/or latency-intensive process flows (e.g., primary NLU process flow 104, fallback processing A, etc.) may have already returned acceptable result data and that, therefore, processing by fallback processing B may be cancelled and/or terminated.

In some examples, fallback processing B may initially determine a likelihood that fallback processing B will be able to interpret the current ASR output data at action 224. In various examples, a rule-based approach and/or a machine learning based approach may be used to determine whether or not the fallback processing strategy represented by fallback processing B will be able to interpret the current ASR output data. In some examples, if a determination is made that fallback processing B is unlikely to be able to interpret the current ASR output data, processing by fallback processing B may be terminated at action 224. For example, if a confidence score of successful processing by fallback processing B is below a threshold confidence score, processing may be terminated. In the example depicted in FIG. 2, determination of the likelihood that fallback processing B will be successful at action 224 may be of a longer duration relative to the corresponding action of fallback processing A, at action 212. This may be another reason for delaying execution by fallback processing B until one or more other NLU process flows have had an opportunity to complete processing (e.g, in order to optimize for latency and/or compute cost).

Fallback processing B may continue to action 226 at which fallback processing B may perform pipeline specific processing. In the current example, the pipeline specific processing of fallback processing B may include a call to a machine learning model. Such a call may be latency intensive. Accordingly, in some examples, fallback processing B may be contingently performed when primary NLU process flow 104 and/or fallback processing A are either unable to provide an acceptable result or are unlikely to be able to provide an acceptable result (e.g., based on a preliminary estimate determined based on the particular ASR output data). In some examples, after performing ER processing (and/or receiving cached ER result data following ER processing by primary NLU process flow 104) fallback processing B may convert the ASR output data into strings of text data representing the natural language input, but with blanks (e.g., data indicating a generic entity) instead of any recognized named entities. For example, for the utterance "What is the capital of France?" the named entities "capital" and "France" may be recognized. Fallback processing B may generate the string data "What is the [entity data] of France?" and the string data "What is the capital of [entity data]?" The string data may be sent to a machine learning model that may predict what attributes the user is asking about. The machine learning model may output a semantic representation of the ASR output data at action 228. In various examples, because the call to the machine learning model may be latency intensive, the fallback processing B may in some cases only be performed when other NLU processing flows are unsuccessful.

Figure 3:
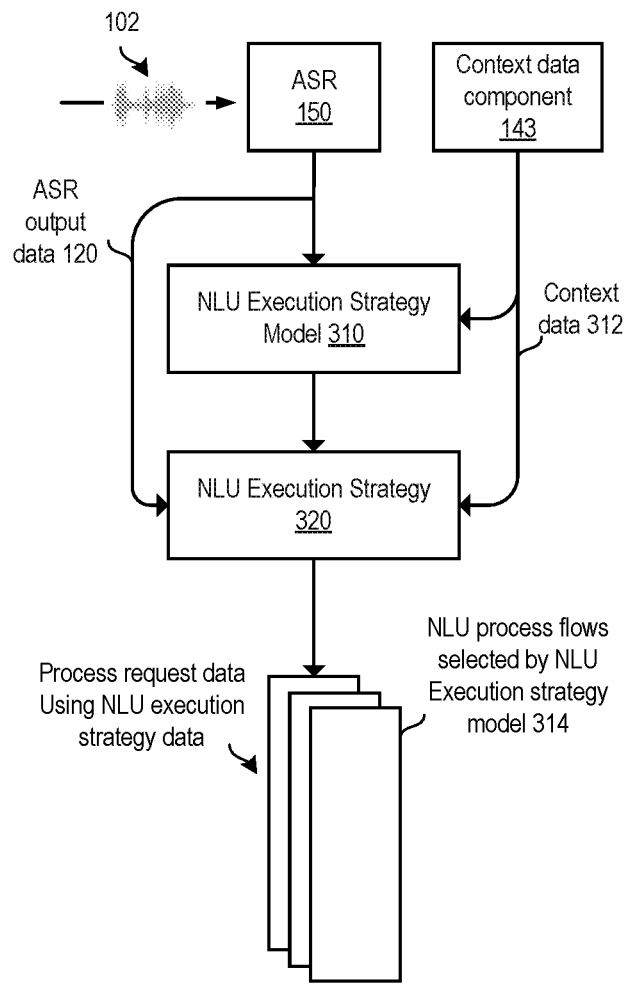
FIG. 3 is a block diagram illustrating determining an NLU execution strategy for request data, in accordance with various embodiments described herein.

FIG. 3 is a block diagram illustrating determining an NLU execution strategy for request data, in accordance with various embodiments described herein. In various examples, ASR output data 120 may be sent to an NLU execution strategy model 310. In addition, in some examples, context data associated with the ASR output data 120 may be sent by a context data component 143 to the NLU execution strategy model 310. Context data may include previous utterances from the same speech processing-enabled device, a device ID, a user ID, geographic location data, time of day data, weather data, etc.

NLU execution strategy model 310 may be a machine learning model, such as a neural network, for example, that may be trained to determine an optimized NLU execution strategy 320 based on the current ASR output data 120 and/or based on context data 312. NLU execution strategy model 310 may be trained to optimize for latency of NLU processing (e.g., the time between receiving ASR output data 120 and generating NLU output data (e.g., intent data) representing a semantic interpretation of the ASR output data 120). In various other examples, the NLU execution strategy model 310 may be trained to optimize for compute cost of NLU processing. In some further examples, the NLU execution strategy model 310 may be trained to optimize for NLU accuracy. In yet other examples, the NLU execution strategy model 310 may be trained to optimize for some combination of these constraints. The NLU execution strategy model 310 may be trained using labeled training data in a supervised setting, in some examples. In various other examples, the NLU execution strategy model 310 may be trained in a reinforcement learning setting based on some definition of a cumulative reward to be maximized during model updates.

In order to optimize for the various constraints described above, the NLU execution strategy model 310 may generate NLU execution strategies 320 that may employ one or more of the techniques described above in reference to FIGS. 1 and 2. For example, in order to optimize for latency, the NLU execution strategy model 310 may perform one or more of the various NLU process flows (e.g., primary NLU process flow 104, fallback processing A, B, C, etc.) in parallel. Additionally, processing of one or more process flows may be cancelled and/or terminated upon the determination of acceptable NLU result data by some other process flow. However, in some cases, such a strategy may result in increased cost, as all process flows may be executed in parallel. In another example, in order to optimize for cost, the NLU execution strategy model 310 may perform one or more of the various NLU process flows (e.g., primary NLU process flow 104, fallback processing A, B, C, etc.) serially. However, such processing may result in increased latency as many NLU process flows may be needed to understand a particular utterance and a subsequent NLU process flow may be executed only when the current NLU process flow is unable to determine an acceptable semantic interpretation.

Additionally, in various examples, the NLU execution strategy model 310 may determine an NLU execution strategy whereupon various NLU process flows are executed at least partially in parallel, but where execution of different NLU process flows are delayed by different times in a way that maximizes overall benefit (e.g., in terms of latency reduction, CPU cost reduction, and/or result accuracy). Additionally, the order in which different NLU process flows are executed may be determined in a way that optimizes for one or more of the pertinent constraints. For example, intermediate data generated early during a first NLU process flow may be used late in a second NLU process flow. Accordingly, the NLU execution strategy model 310 may generate an NLU execution strategy 320 that executes the first NLU process flow prior to execution of the second NLU process flow in order to reduce latency and CPU cost. Additionally, the NLU execution strategy 320 may instruct the first NLU process flow to cache the intermediate data in a cache accessible by the second NLU process flow.

Accordingly, the NLU execution strategy 320 output by the NLU execution strategy model 310 may comprise computer-readable instructions that, when executed by at least one processor, are effective to cause the selected NLU process flows (e.g., NLU process flows selected by NLU execution strategy model 314) to process request data (e.g., ASR output data) according to a particular strategy that is determined to optimize for one or more objectives (e.g., latency reduction, CPU cost reduction, result accuracy, etc.).

Figure 4:
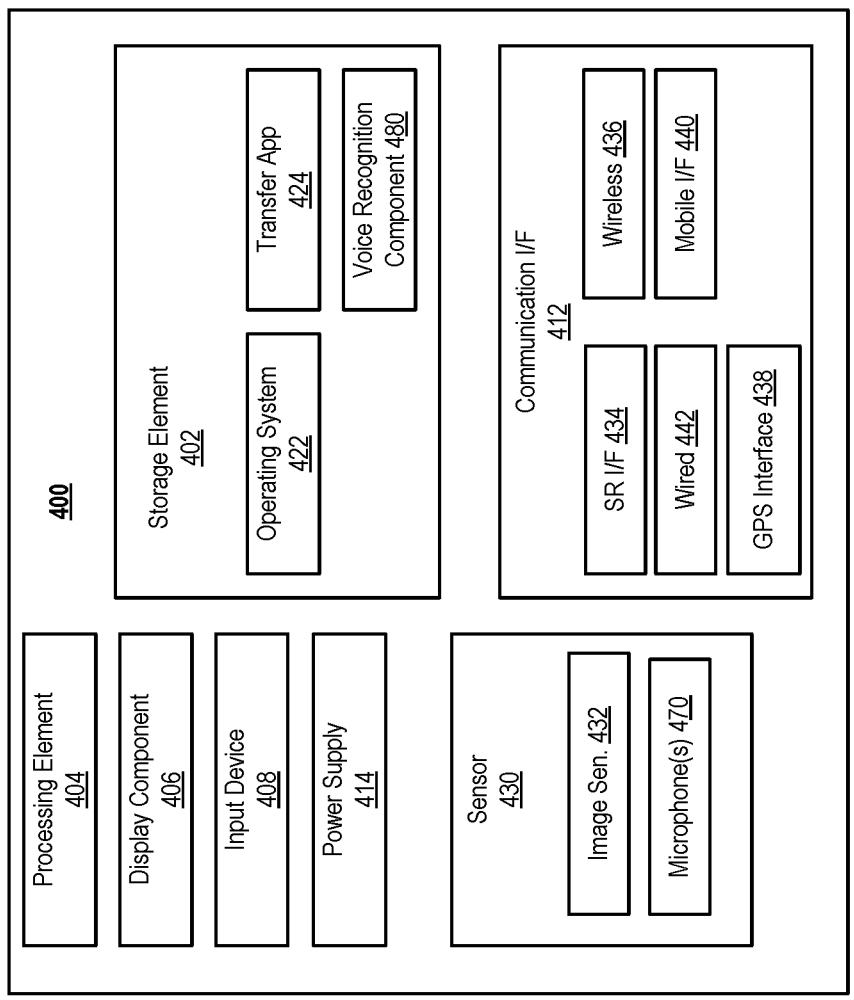
FIG. 4 is a block diagram showing an example architecture of a speech processing-enabled device that may be used in accordance with various embodiments described herein.

FIG. 4 is a block diagram showing an example architecture 400 of a computing device that may be used to implement, at least in part, a speech processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
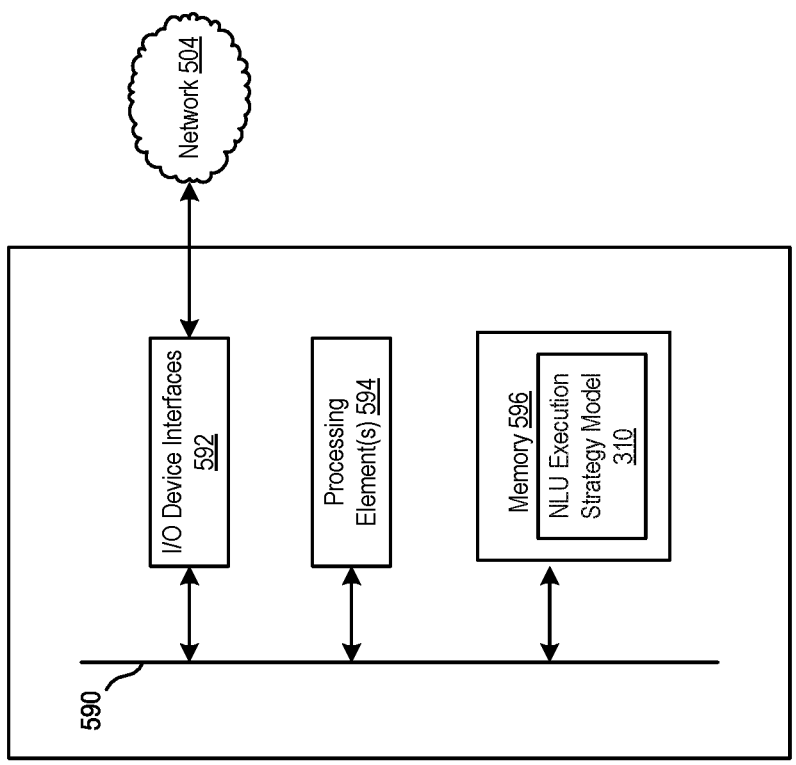
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 160, such as the NLU execution strategy model 310 described above in reference to FIG. 3, when loaded from memory 596. In various further examples, memory 596 may be effective to store instructions effective to program controllers/processors 594 to perform the various techniques described above in reference to FIGS. 1-3. Accordingly, in FIG. 5, NLU execution strategy model 310 is depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models, and/or the NLU process flow result data, ER result data, and/or other intermediate result data generated by one or more of the NLU process flows may be stored and/or cached in memory 596.

Computer instructions for operating each computing device of speech processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
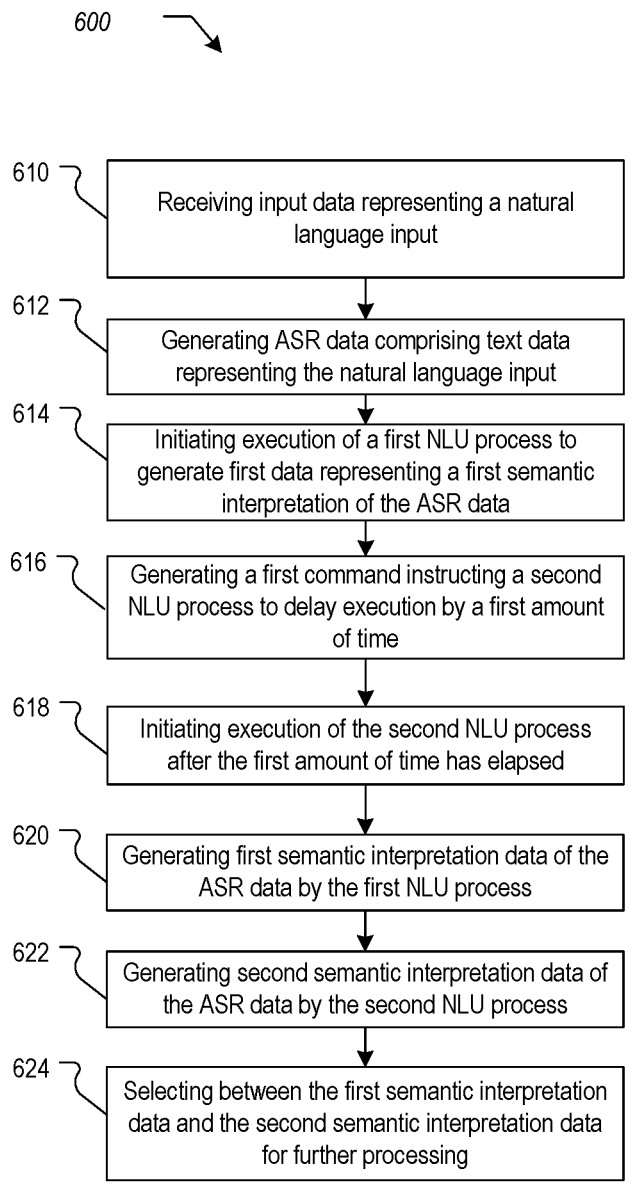
FIG. 6 depicts a flow chart showing an example process for execution of natural language process flows, in accordance with various aspects of the present disclosure.

FIG. 6 depicts a flow chart showing an example process 600 for generating pre-computed feature data used for execution of natural language process flows, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which input data representing a natural language input may be received. In various examples, the input data may comprise audio data representing a user utterance and/or text data representing input user text. In some examples, the input data, in whatever form, may represent a user's question for processing by a speech processing system.

Processing may continue from action 610 to action 612, at which ASR data may be generated comprising text data representing the input data (and thus the natural language input) received at action 610. In some examples, additional ASR data may be generated in addition to the text data (e.g., ASR confidence scores and/or multiple ASR text hypotheses for the input data). Processing may continue from action 612 to action 614, at which execution of a first NLU process may be initiated. The first NLU process may be, for example, primary NLU process flow 104 and/or one or more of fallback processing A, B, and/or C depicted in FIGS. 1 and 2. The NLU process flow may be configured to receive the ASR data and may attempt to generate semantic interpretation data representing the ASR data using rule-based and/or machine learning techniques (or some combination thereof).

Processing may continue from action 614 to action 616, at which a first command may be generated instructing a second NLU process to delay execution of the ASR data by a first amount of time and/or until specified data is cached and/or otherwise available. For example, the first command may comprise computer-readable instructions effective to cause a fallback NLU process flow to delay execution for a first amount of time. In another example, the first command may instruct a fallback NLU process flow to await some data made available by another process flow and/or another speech processing component. For example, the first command may instruct fallback processing A to await ER result data computed by primary NLU process flow 104 prior to execution of fallback processing A.

Processing may continue from action 616 to action 618 at which execution of the second NLU process may be initiated after the first amount of time has elapsed. In another example, the execution of the second NLU process may be initiated after some pre-specified data (e.g., ER result data) is available in a cache or other memory. Processing may continue from action 618 to action 620, at which first semantic interpretation data by the first NLU process (e.g., primary NLU process 104 or some other NLU process) may be generated. Processing may continue from action 620 to action 622, at which second semantic interpretation data by the second NLU process (e.g., fallback processing A, B, C, or some other NLU process) may be generated. At action 624, the speech processing system may select between the first semantic interpretation and the second semantic interpretation data for further processing (e.g., for processing of intent data of the semantic interpretation data by one or more skills and/or other speech processing applications). In some examples, respective confidence scores associated with the first and second semantic interpretation data (e.g., NLU output data comprising intent data) may be used to select between the first and second semantic interpretation data.

Figure 7:
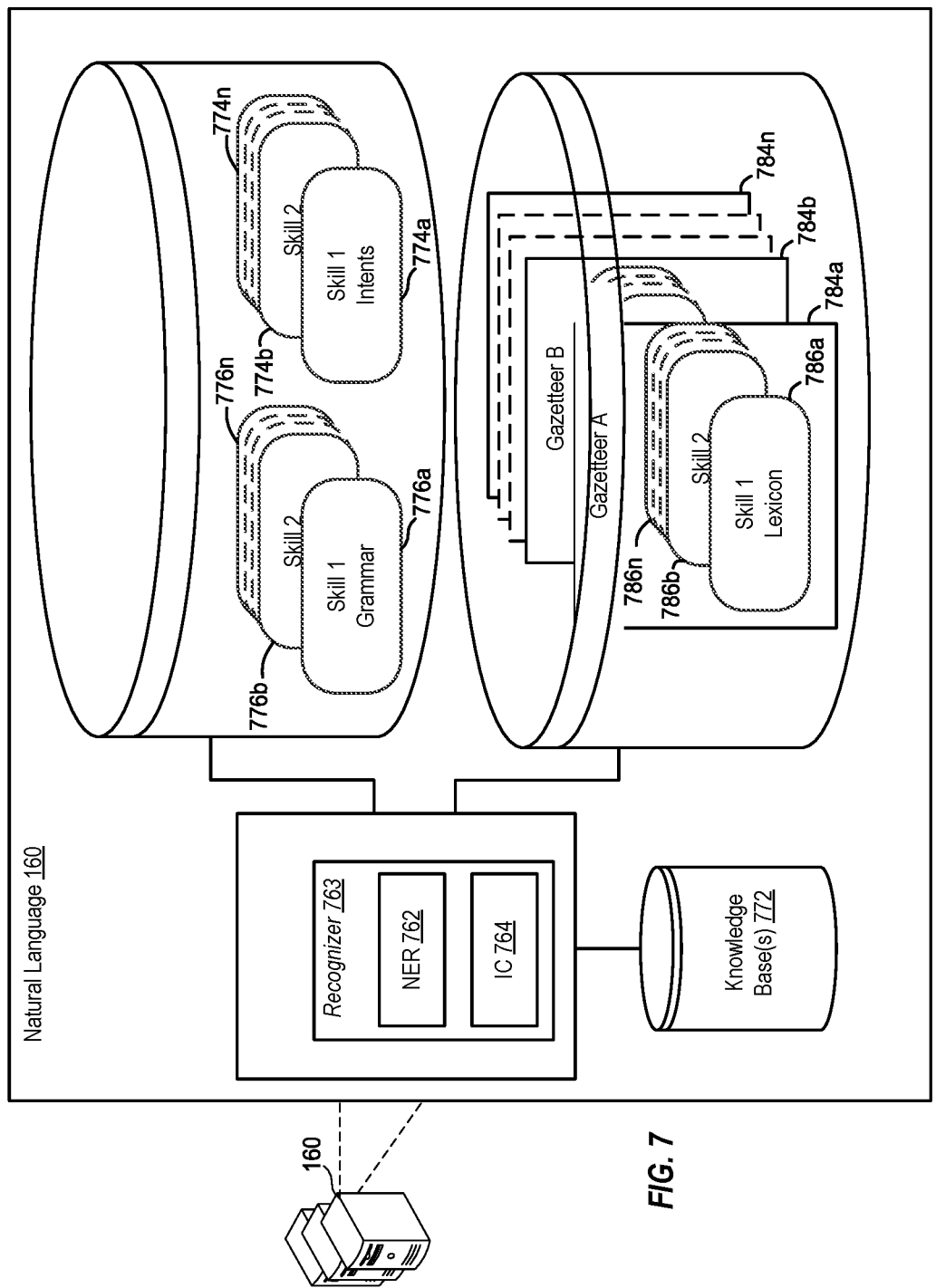
FIG. 7 is a conceptual diagram illustrating how natural language understanding processing is performed according to embodiments of the present disclosure.

FIG. 7 illustrates how NLU processing is performed on text data and/or other ASR output data. One or more of the techniques described below in reference to FIG. 7 may represent various techniques used during primary NLU process flow 104 and/or fallback processing A, B, C, etc. Generally, the NLU component 160 attempts to make a semantic interpretation of text data input thereto. That is, the NLU component 160 determines the meaning behind text data based on the individual words and/or phrases represented therein. The NLU component 160 interprets text data to derive an intent of the user as well as pieces of the text data that allow a device (e.g., a speech processing enabled device, the speech processing system 100, etc.) to complete that action.

The NLU component 160 may process text data including several ASR hypotheses. The NLU component 160 may process all (or a portion of) the ASR hypotheses input therein. Even though the ASR component 150 may output multiple ASR hypotheses, the NLU component 160 may be configured to only process with respect to the top scoring ASR hypothesis. Additionally, as described herein, the ASR component 150 may generate confidence scores associated with each hypothesis (e.g., the confidence scores described above in reference to Table 1).

The NLU component 160 may include one or more recognizers 763. Each recognizer 763 may be associated with a different skill. Each recognizer 763 may process with respect to text data input to the NLU component 160. Each recognizer 763 may operate at least partially in parallel with other recognizers 763 of the NLU component 160.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity that may be applicable to processing performed by a skill. The NER component 762 (or other component of the NLU component 160) may also determine whether a word refers to an entity whose identity is not explicitly mentioned in the text data, for example "him," "her," "it" or other anaphora, exophora or the like.

Each recognizer 763, and more specifically each NER component 762, may be associated with a particular grammar model and/or database, a particular set of intents/actions (e.g., in intents database 774), and a particular personalized lexicon 786. Each gazetteer 784 may include skill-indexed lexical information associated with a particular user and/or speech processing enabled device. For example, a Gazetteer A (784a) includes skill-indexed lexicon 786a to 786n. A user's music skill lexical information might include album titles, artist names, and song names, for example, whereas a user's contact list skill lexical information might include the names of contacts. Since every user's music collection and contact list is presumably different, this personalized information improves entity resolution.

An NER component 762 applies grammar models 776 and lexicon 786 to determine a mention of one or more entities in text data. In this manner, the NER component 762 identifies "slots" (corresponding to one or more particular words in text data) that may be used for later processing. The NER component 762 may also label each slot with a type (e.g., noun, place, city, artist name, song name, etc.). As previously described, each recognizer 763 may generate confidence scores associated with each named entity and/or with each match of a named entity. In at least some examples, the NER component 762 may compute the ER data that may be used by one or more of the NLU process flows described above.

Each grammar model 776 includes the names of entities (i.e., nouns) commonly found in speech about the particular skill to which the grammar model 776 relates, whereas the lexicon 786 is personalized to the user and/or a speech processing enabled device from which the user input originated. For example, a grammar model 776 associated with a shopping skill may include a database of words commonly used when people discuss shopping.

Each recognizer 763 may also include an intent classification (IC) component 764. An IC component 764 parses text data to determine an intent(s). An intent represents an action a user desires be performed. An IC component 764 may communicate with an intents database 774 of words linked to intents. For example, a music intent database may link words and phrases such as "quiet," "volume off," and "mute" to a <Mute> intent. An IC component 764 identifies potential intents by comparing words and phrases in text data to the words and phrases in an intents database 774.

The intents identifiable by a specific IC component 764 are linked to skill-specific grammar models 776 with "slots" to be filled. Each slot of a grammar model 776 corresponds to a portion of text data that the system believes corresponds to an entity. For example, a grammar model 776 corresponding to a <PlayMusic> intent may correspond to sentence structures such as "Play {Artist Name}," "Play {Album Name}," "Play {Song name}," "Play {Song name} by {Artist Name}," etc. However, to make resolution more flexible, grammar models 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (e.g., implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786, attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as hidden Markov models, maximum entropy models, log linear models, conditional random fields (CRF), and the like. For example, an NER component 762 implemented by a music recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 identifies "Play" as a verb, which an IC component 764 may determine corresponds to a <PlayMusic> intent. At this stage, no determination has been made as to the meaning of "mother's little helper" and "the rolling stones," but based on grammar rules and models, the NER component 762 has determined the text of these phrases relates to the grammatical object (i.e., entity) of the user input represented in the text data.

The models linked to the intent are then used to determine what database fields should be searched to determine the meaning of these phrases, such as searching a user's gazetteer 784 for similarity with the model slots. For example, a model for a <PlayMusic> intent might indicate to attempt to resolve the identified object based on {Artist Name}, {Album Name}, and {Song name}, and another model for the same intent might indicate to attempt to resolve the object modifier based on {Artist Name}, and resolve the object based on {Album Name} and {Song Name} linked to the identified {Artist Name}. If the search of the gazetteer 784 does not resolve a slot/field using gazetteer information, the NER component 762 may search a database of generic words (e.g., in the knowledge base 772). For example, if the text data includes "play songs by the rolling stones," after failing to determine an album name or song name called "songs" by "the rolling stones," the NER component 762 may search the database for the word "songs." In the alternative, generic words may be checked before the gazetteer information, or both may be tried, potentially producing two different results.

An NER component 762 may tag text data to attribute meaning thereto. For example, an NER component 762 may tag "play mother's little helper by the rolling stones" as: {skill} Music, {intent}<PlayMusic>, {artist name} rolling stones, {media type} SONG, and {song title} mother's little helper. For further example, the NER component 762 may tag "play songs by the rolling stones" as: {skill} Music, {intent}<PlayMusic>, {artist name} rolling stones, and {media type} SONG.

The NLU component 160 may generate cross-skill N-best list data, which may include a list of NLU hypotheses output by each recognizer 763. A recognizer 763 may output tagged text data generated by an NER component 762 and an IC component 764 operated by the recognizer 763, as described above. Each NLU hypothesis including an intent indicator and text/slots may be grouped as an NLU hypothesis represented in cross-skill N-best list data. Each NLU hypothesis may also be associated with one or more respective confidence score(s) for the NLU hypothesis. For example, the cross-skill N-best list data may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A natural language understanding method, comprising:
receiving input audio data representing an utterance;
generating, from the input audio data, automatic speech recognition (ASR) data comprising first text data representing the utterance;
initiating execution of a first natural language understanding (NLU) process using the ASR data;
setting a delay for execution of a second NLU process, by at least one processor, by a first amount of time from when the execution of the first NLU process is initiated, wherein the first amount of time is sufficient to allow the first NLU process to perform entity recognition (ER) processing;
determining, by the at least one processor, that the first amount of time has elapsed;
initiating execution of the second NLU process using the ASR data after the first amount of time has elapsed;
generating, by the first NLU process, first data indicating that the first NLU process was unable to determine a semantic interpretation of the ASR data; and
generating, by the second NLU process, second data representing the semantic interpretation of the ASR data.

2. The method of claim 1, further comprising:
performing ER processing to identify a first entity represented in the first text data, wherein the ER processing is performed as part of the first NLU process;
storing third data representing the first entity in a cache; and
receiving, by the second NLU process from the cache, the third data representing the first entity, wherein the second data is generated by the second NLU process using the third data.

3. The method of claim 1, further comprising:
delaying execution of a third NLU process by a second amount of time greater than the first amount of time due to the third NLU process taking longer to complete relative to the first NLU process and the second NLU process, wherein the second amount of time is sufficient to allow the first NLU process or the second NLU process to complete prior to execution of the third NLU process;
determining that the first data is generated by the first NLU process prior to execution of the third NLU process; and
sending a third command to the third NLU process instructing the third NLU process to terminate processing of the ASR data.

4. A method, comprising:
receiving input data;
generating automatic speech recognition (ASR) data representing the input data;
initiating processing of the ASR data by a first natural language understanding (NLU) process;
setting, by at least one processor, a first amount of time by which to delay processing of the input data by a second NLU process;
determining, by the at least one processor, that the first amount of time has elapsed;
initiating processing of the ASR data by the second NLU process after the first amount of time has elapsed since the initiating the processing of the ASR data by the first NLU process;
generating, by the first NLU process, first result data indicating that the first NLU process is unable to interpret the ASR data; and
generating, by the second NLU process, second result data comprising an interpretation of the ASR data.

5. The method of claim 4, further comprising:
storing, by the second NLU process, the second result data in a non-transitory computer-readable memory;
determining, from the first result data, that the first NLU process was unable to interpret the ASR data; and
searching the non-transitory computer-readable memory for the second result data based at least in part on the determining that the first NLU process was unable to interpret the ASR data.

6. The method of claim 4, further comprising:
determining that the first NLU process is unable to interpret the ASR data based at least in part on the first result data;
searching a first non-transitory computer-readable memory associated with the second NLU process for the second result data based at least in part on the first result data; and
receiving, from the first non-transitory computer-readable memory, the second result data.

7. The method of claim 6, further comprising:
determining a third NLU process scheduled to process the ASR data; and
sending a command to the third NLU process to cancel processing of the ASR data based at least in part on the receiving, from the first non-transitory computer-readable memory, the second result data.

8. The method of claim 4, further comprising setting a second amount of time by which to delay processing of the ASR data by a third NLU process, wherein the second amount of time is greater than the first amount of time based at least in part on the third NLU process being of a longer duration relative to the second NLU process.

9. The method of claim 4, further comprising:
receiving context data associated with the ASR data;
generating, by the first NLU process, first result data comprising a first interpretation of the ASR data;
generating, by the second NLU process, second result data comprising a second interpretation of the ASR data; and
selecting between the first interpretation and the second interpretation based at least in part on the context data.

10. The method of claim 4, further comprising:
sending the ASR data to a machine learning model; and
selecting, by the machine learning model, the first NLU process and the second NLU process from among a set of NLU processes to process the ASR data.

11. The method of claim 10, further comprising:
determining, by the machine learning model, the first amount of time by which to delay processing of the ASR data by the second NLU process;
determining, by the machine learning model, a third NLU process for processing the ASR data; and
determining, by the machine learning model, a second amount of time by which to delay processing of the ASR data by the third NLU process.

12. The method of claim 4, further comprising:
generating, by the first NLU process, entity recognition data identifying entities represented by the ASR data;

storing, by the first NLU process, the entity recognition data in a non-transitory computer-readable memory;

receiving, by the second NLU process following the first amount of time, the entity recognition data; and processing, by the second NLU process, the ASR data based at least in part on the entity recognition data.

13. A computing device, comprising:

at least one processor; and non-transitory computer-readable memory storing instructions that, when executed by the at least one processor, are effective to program the at least one processor to:

receive input data;

generate automatic speech recognition (ASR) data representing the input data;

initiate processing of the ASR data by a first natural language understanding (NLU) process;

set, by the at least one processor, a first amount of time by which to delay processing of the ASR data by a second NLU process;

determine, by the at least one processor, that the first amount of time has elapsed;

initiate processing of the ASR data by the second NLU process after the first amount of time has elapsed since the initiating the processing of the ASR data by the first NLU process;

generate, by the first NLU process, first result data indicating that the first NLU process is unable to interpret the ASR data; and generate, by the second NLU process, second result data comprising an interpretation of the ASR data.

14. The computing device of claim 13, the non-transitory computer-readable memory storing further instructions that, when executed by the at least one processor are further effective to program the at least one processor to:

store, by the second NLU process, the second result data in second non-transitory computer-readable memory;

determine, from the first result data, that the first NLU process was unable to interpret the ASR data; and search the second non-transitory computer-readable memory for the second result data based at least in part on the determining that the first NLU process was unable to interpret the ASR data.

15. The computing device of claim 13, the non-transitory computer-readable memory storing further instructions that, when executed by the at least one processor are further effective to program the at least one processor to:

determine that the first NLU process is unable to interpret the ASR data based at least in part on the first result data;

search second non-transitory computer-readable memory associated with the second NLU process for the second result data based at least in part on the first result data; and receive, from the second non-transitory computer-readable memory, the second result data.

16. The computing device of claim 15, the non-transitory computer-readable memory storing further instructions that, when executed by the at least one processor are further effective to program the at least one processor to:

determine a third NLU process scheduled to process the ASR data; and send a command to the third NLU process to cancel processing of the ASR data based at least in part on the receiving, from the second non-transitory computer-readable memory, the second result data.

17. The computing device of claim 13, the non-transitory computer-readable memory storing further instructions that, when executed by the at least one processor are further effective to program the at least one processor to:

set a second amount of time by which to delay processing of the ASR data by a third NLU process, wherein the second amount of time is greater than the first amount of time based at least in part on the third NLU process being of a longer duration relative to the second NLU process.

18. The computing device of claim 13, the non-transitory computer-readable memory storing further instructions that, when executed by the at least one processor are further effective to program the at least one processor to:

receive context data associated with the ASR data;

generate, by the first NLU process, first result data comprising a first interpretation of the ASR data;

generate, by the second NLU process, second result data comprising a second interpretation of the ASR data; and select between the first interpretation and the second interpretation based at least in part on the context data.

19. The computing device of claim 13, the non-transitory computer-readable memory storing further instructions that, when executed by the at least one processor are further effective to program the at least one processor to:

send the ASR data to a machine learning model; and select, by the machine learning model, the first NLU process and the second NLU process from among a set of NLU processes to process the ASR data.

20. The computing device of claim 13, the non-transitory computer-readable memory storing further instructions that, when executed by the at least one processor are further effective to program the at least one processor to:

generate, by the first NLU process, entity recognition data identifying entities represented by the ASR data;

store, by the first NLU process, the entity recognition data in second non-transitory computer-readable memory;

receive, by the second NLU process following the first amount of time, the entity recognition data from the second non-transitory computer-readable memory; and process, by the second NLU process, the ASR data based at least in part on the entity recognition data.

* * * * *